United States Patent
Keith

[11] Patent Number: 6,007,714
[45] Date of Patent: Dec. 28, 1999

[54] AUXILIARY FILTER ASSEMBLY FOR A SWIMMING POOL SKIMMER

[75] Inventor: Danny A. Keith, Morrow, Ohio

[73] Assignee: Keith Brothers, Inc., Ponte Verda Beach, Fla.

[21] Appl. No.: 09/143,262

[22] Filed: Aug. 28, 1998

[51] Int. Cl.[6] .................................................. B01D 29/27
[52] U.S. Cl. ..................... 210/169; 210/470; 210/474; 210/499
[58] Field of Search ............... 210/169, 242.1, 210/470, 473, 474, 496, 499

[56] References Cited

U.S. PATENT DOCUMENTS

| | | | |
|---|---|---|---|
| 1,728,381 | 9/1929 | Waters | 210/474 |
| 1,734,841 | 11/1929 | Walden | 210/474 |
| 2,980,256 | 4/1961 | Nash | 210/169 |
| 3,252,576 | 5/1966 | Miller | 210/169 |
| 3,497,071 | 2/1970 | Mineo | 210/474 |
| 3,731,875 | 5/1973 | Collingwood et al. | 210/499 |
| 4,221,670 | 9/1980 | Ziemek | 210/474 |
| 4,743,368 | 5/1988 | Gates | 210/169 |
| 4,826,591 | 5/1989 | Macia | 210/169 |
| 4,836,931 | 6/1989 | Spearman et al. | 210/496 |
| 5,045,194 | 9/1991 | Gershenson | 210/470 |
| 5,605,622 | 2/1997 | Ferraro | 210/169 |

*Primary Examiner*—Christopher Upton
*Attorney, Agent, or Firm*—Charles R. Wilson

[57] ABSTRACT

An auxiliary filter assembly is for use in a skimmer of residential swimming pools. The assembly comprises an adaptor collar and a cleanable filter basket. The adaptor collar is substantially flat and is for placement on a rim of a below water surface opening within the skimmer. The cleanable filter basket is made of a water porous material. The filter basket has an open top with a substantially rigid stabilizing ring permanently positioned in an edge defining the open top. The ring is dimensioned to rest on the adaptor collar. Swimming water debris is trapped in the filter basket as pool water is pulled through the filter basket on its way to a primary filter apparatus. The filter basket is easily separated from the adaptor collar, cleaned as needed and replaced.

19 Claims, 4 Drawing Sheets

6,007,714

1

AUXILIARY FILTER ASSEMBLY FOR A SWIMMING POOL SKIMMER

FIELD OF THE INVENTION

This invention relates to a filter assembly. More particularly, the invention relates to an auxiliary filter assembly for use in a swimming pool skimmer to filter debris from the pool water prior to reaching a primary filter apparatus.

BACKGROUND OF THE INVENTION

Residential swimming pools are not uncommon. They can be above ground pools or in ground pools. Typically, the above ground pools hold about 3,000 gallons to about 15,000 gallons water and the in ground pools hold about 10,000 gallons to about 30,000 gallons water. In all cases, the water must be run through a filter apparatus to remove debris, including airborne material such as fallen leaves, other plant material, insects, and material brought into the pool by the swimmer such as hair and lint.

The typical pool has a water intake line which draws water from at least the surface of the pool and ideally from both the surface and the bottom of the pool. The water at the surface level is initially pulled into a skimmer and passed through a skimmer basket. The skimmer basket is a rigid mesh basket which filters out larger debris, e.g. leaves. The water then is conveyed by a pipeline to a primary filter apparatus to filter out more minute debris. There are different filter apparatus. Sand or diatomaceous earth are common filter medias. Periodically, the filter media in the filter apparatus becomes clogged and must be replaced. This involves a fairly arduous task of disassembling the filter apparatus, removing the filter media, discarding the filter media, adding fresh filter media to the filter apparatus, and reassembling the filter apparatus. Needless to say, the typical swimming pool owner would rather be swimming.

There is a need for a filter system to lessen or even eliminate the current necessity of periodic replacing of filter media in the filter apparatus. In accord with the need, there have been developed pre-main filter apparatus systems. U.S. Pat. Nos. 5,202,020 and 5,672,271 disclose devices for placement in the swimming pool's skimmer basket. The device of U.S. Pat. No. 5,202,020 appears costly to manufacture. The device of U.S. Pat. No. 5,672,271 appears difficult to use.

In accord with a continued need for a pre-primary filter apparatus filtering system, there has now been developed an assembly for use in the pool's skimmer. The assembly is economical to produce, easy to use and efficient in operation. The assembly of the invention effectively filters debris from the swimming pool water before it reaches the pool's primary filter assembly. The assembly is very conveniently cleaned and reused.

SUMMARY OF THE INVENTION

An auxiliary filter assembly is adapted for use in a skimmer of residential swimming pools. The assembly comprises an adaptor collar and a cleanable filter basket. The adaptor collar is dimensioned for placement on a rim of a below water surface opening found within the skimmer. The cleanable filter basket is made of a water porous material and is operably associated with the adaptor collar. The filter basket has an open top with a substantially rigid stabilizing ring permanently positioned in an edge defining the open top. The stabilizing ring is dimensioned to rest on the adaptor collar. Swimming water is pulled through the skim-

2 mer with debris trapped in the filter basket. The filter basket is easily separated from the adaptor collar, cleaned and replaced.

DETAILED DESCRIPTION OF THE INVENTION

Figure 1:
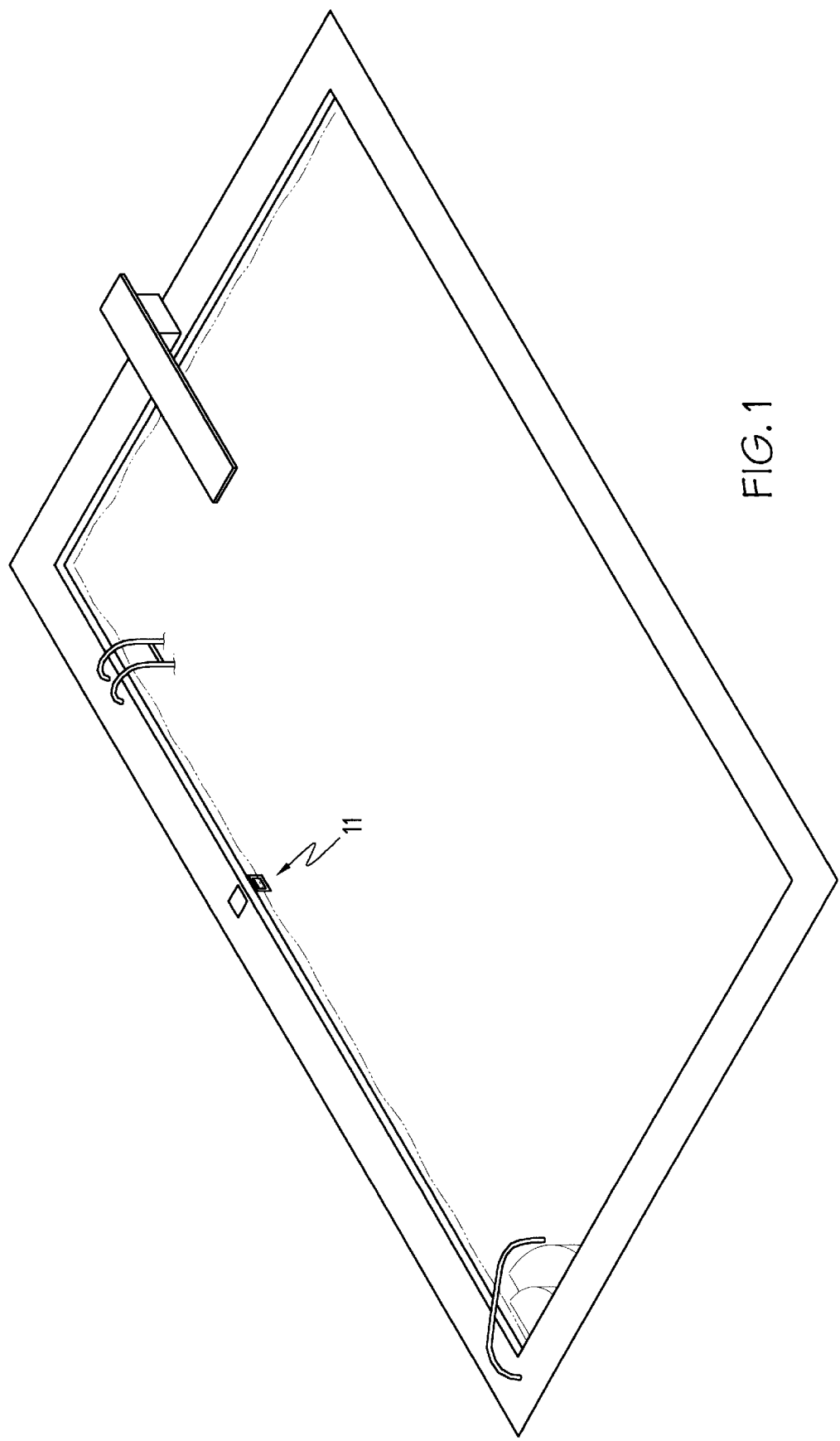
FIG. 1 is an environmental view of a residential in ground swimming pool having a skimmer with the auxiliary filter assembly of the invention positioned in the skimmer.

The auxiliary filter assembly of the invention is described with reference to the drawings and in the following paragraphs. While an in ground pool is depicted in the drawings, the auxiliary filter assembly is useful as well with an above ground pool.

Figure 2:
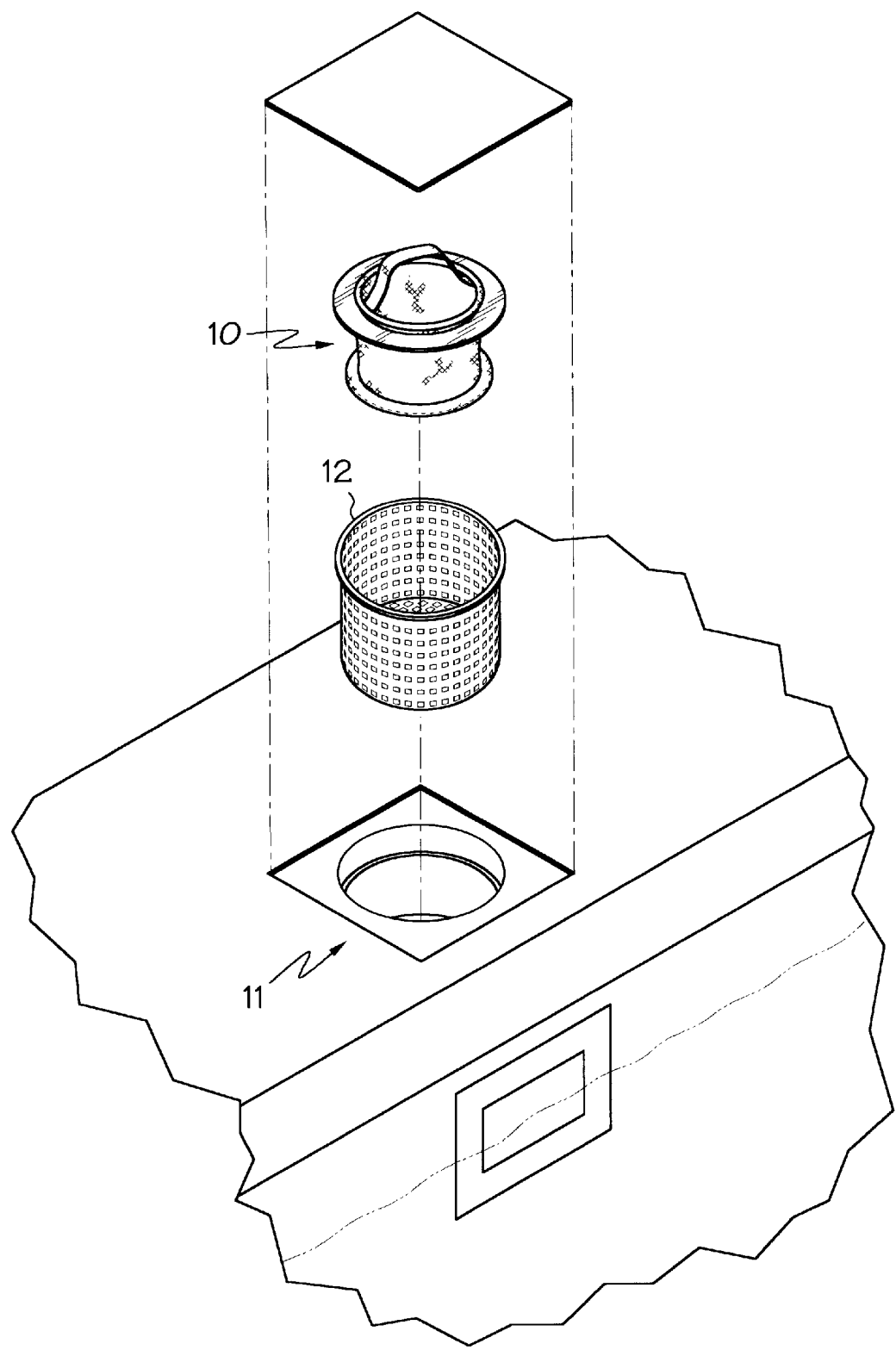
FIG. 2 is an exploded view in perspective of a portion of the swimming pool of FIG. 1 showing the skimmer in more detail and showing the auxiliary filter assembly of the invention.

With reference to FIGS. 1 and 2, the auxiliary filter assembly 10 of the invention is intended to be used in the skimmer 11 of a residential swimming pool. The skimmer is conventional. It basically is a hole which is open on one side and in direct communication with the swimming pool to receive pool water. It is also open on top to allow access to a skimmer basket 12 removably positioned in the skimmer. A pipeline (not shown) leads from the bottom of the skimmer. A pump and primary filter apparatus (also not shown) draws water through the pipeline from the skimmer. As well known, the skimmer basket 12 is rigid with holes in a bottom wall and side walls. An about one-quarter inch mesh opening is typically used to filter out leaves and other large debris from flowing through the pipeline and permanently clogging up the primary filter apparatus.

Figure 3:
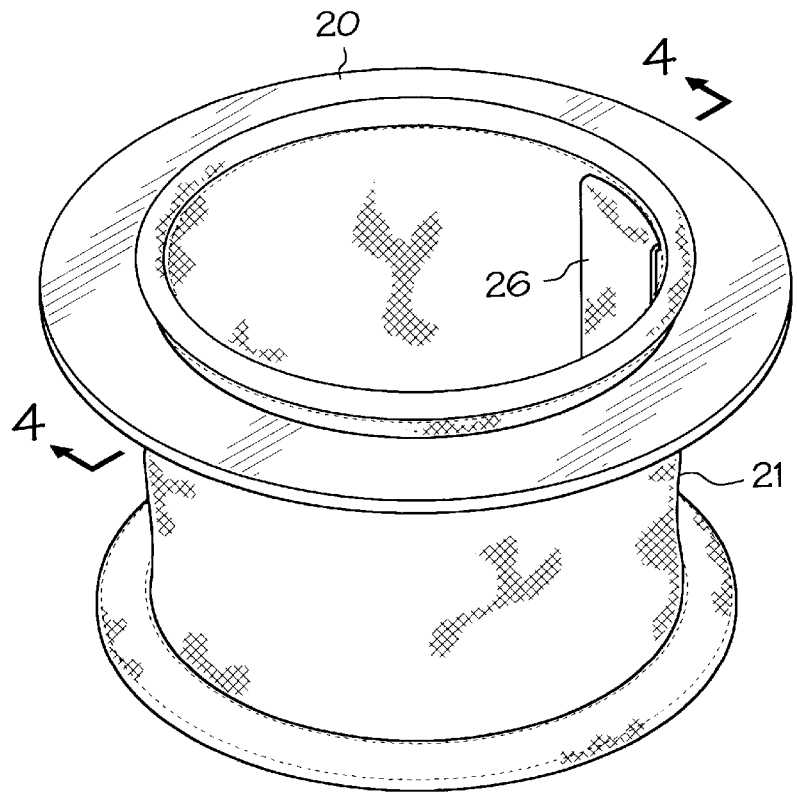
FIG. 3 is a perspective view of the auxiliary filter assembly of FIG. 2 isolated from the skimmer of the swimming pool.

The auxiliary filter assembly 10 fits into the skimmer basket 12 of the skimmer 11. As best seen in FIG. 3, the auxiliary filter assembly 10 comprises as its essential components an adaptor collar 20 and a cleanable filter basket 21. They interact to create a stable unit during operation, yet are readily disassembled for periodic cleaning purposes. Each of the essential components of the assembly of the invention is described in detail in the following paragraphs.

Figure 4:
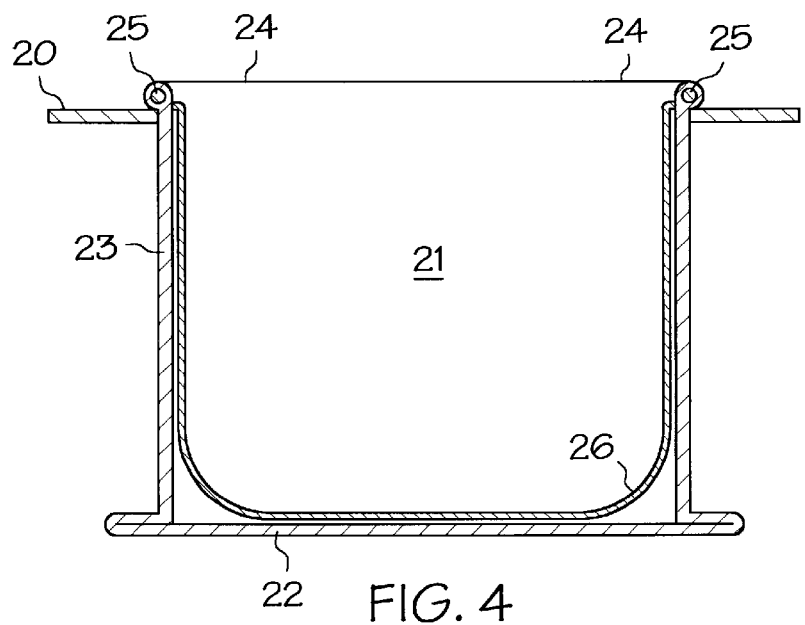
FIG. 4 is a side view in section of the auxiliary filter assembly of FIG. 3.

With reference to FIGS. 3 and 4, the adaptor collar 20 is a substantially flat circular ring which has an outside diameter and an inside diameter sized to fit into the skimmer. The adaptor collar 20 rests on a rim of an opening within the skimmer which leads to the pipeline. Preferably, the outside diameter of the adaptor collar is about five inches to about ten inches and the inside diameter of the adaptor collar is about three and one-half inches to about eight and one-half inches. The adaptor collar has a width of about one inch to about two inches. An adaptor collar of the preferred dimensions ensures that the collar will properly fit in standard sized skimmer holes.

The adaptor collar 20 is made of a substantially rigid material to withstand water forces created by the pump used with the primary filter apparatus in pulling water through the skimmer hole. The material also must be non-toxic and ideally have anti-bacterial properties to minimize bacteria growth on it. Examples of suitable materials used to make the adaptor collar include stainless steel and plastics made from synthetic resins such as polyvinylchlorides, polyurethanes, polyethlenes and polypropylenes. A preferred adaptor collar is made of a foamed polyvinylchoride material and has an about 100 mil to about 400 mil thickness. It also will not readily deteriorate in chlorinated water as typically found in swimming pools.

The filter basket 21 of water porous material is configured to fit into the skimmer basket and rest on a top edge of the adaptor collar 20. As best seen in FIGS. 3 and 4, the filter basket 21 is cylindrical-shaped with a substantially flat bottom wall 22, curved side wall 23 and a top edge 24. The top edge 24 defines an open-top which receives swimming pool water and debris during use. The filter basket preferably has a diameter of about four inches to about ten inches and a height of about three inches to about five inches. These dimensions are conducive to the top edge 24 of the filter basket 21 contacting the adaptor collar 20 and fitting fully into the skimmer hole and skimmer basket. In use there is about one to three inches of head space between the bottom wall 22 of the filter basket 21 and the bottom wall of the skimmer basket 12 to receive solid chlorine tablets.

The filter basket 21 is made of a water porous material capable of filtering out swimming pool water debris. The porous material must allow water to pass through while retaining debris as small as 100 microns. The porous material must also have a strength to withstand the forces of the water flow into the skimmer. Examples of such porous materials include woven and non-woven synthetic fabrics such as polyester and nylon.

The top edge 24 of the filter basket 21 has a substantially rigid stabilizing ring 25 permanently secured to it. The stabilizing ring 25 contacts the adaptor collar 20 and holds the associated filter basket 21 to the collar 20. Accordingly, the ring has a diameter greater than the adaptor collar's inside diameter and less than the adaptor collar's outside diameter. Preferably, the stabilizing ring has a diameter of from about four inches to about nine inches. Optimally, the top edge of the filter basket is turned down and sewed to a side wall to trap the ring within it.

The stabilizing ring is preferably made of stainless steel to inhibit rusting. It can as well be made of a rigid plastic or any other material having the needed strength and durability.

An optional handle 26 is added to the filter basket to aid in its separation from the adaptor collar and removal from the skimmer hole for cleaning purposes. With reference to FIG. 2, the handle is a strap attached at a first end to a side wall of the filter basket and attached at a second end to an opposed side wall, both near the filter basket's open top. As evident in FIG. 4, the handle 26 has sufficient length to lay flat along the side and bottom walls of the filter basket while water is flowing through the filter basket so as not to disrupt the water flow. To remove the filter basket, the handle is simply grasped and lifted.

In use, the filter basket is slid down into the adaptor collar until the stabilizing ring in the top edge of the filter basket contacts the adaptor collar. The assembly is then placed in the skimmer hole and positioned on the rim of the skimmer's opening leading to the skimmer basket and pipeline. The filter basket can be left in place and trap debris over several days as pool water is pulled into the skimmer. Periodically, the whole assembly or just the filter basket is removed. It is cleaned simply by turning the basket inside out and spraying water onto it. The debris is easily dislodged. The filter basket is turned back to its original state and repositioned onto the adaptor collar. Alternatively, the filter basket can be discarded and a new filter basket be used as a replacement.

Figure 5:
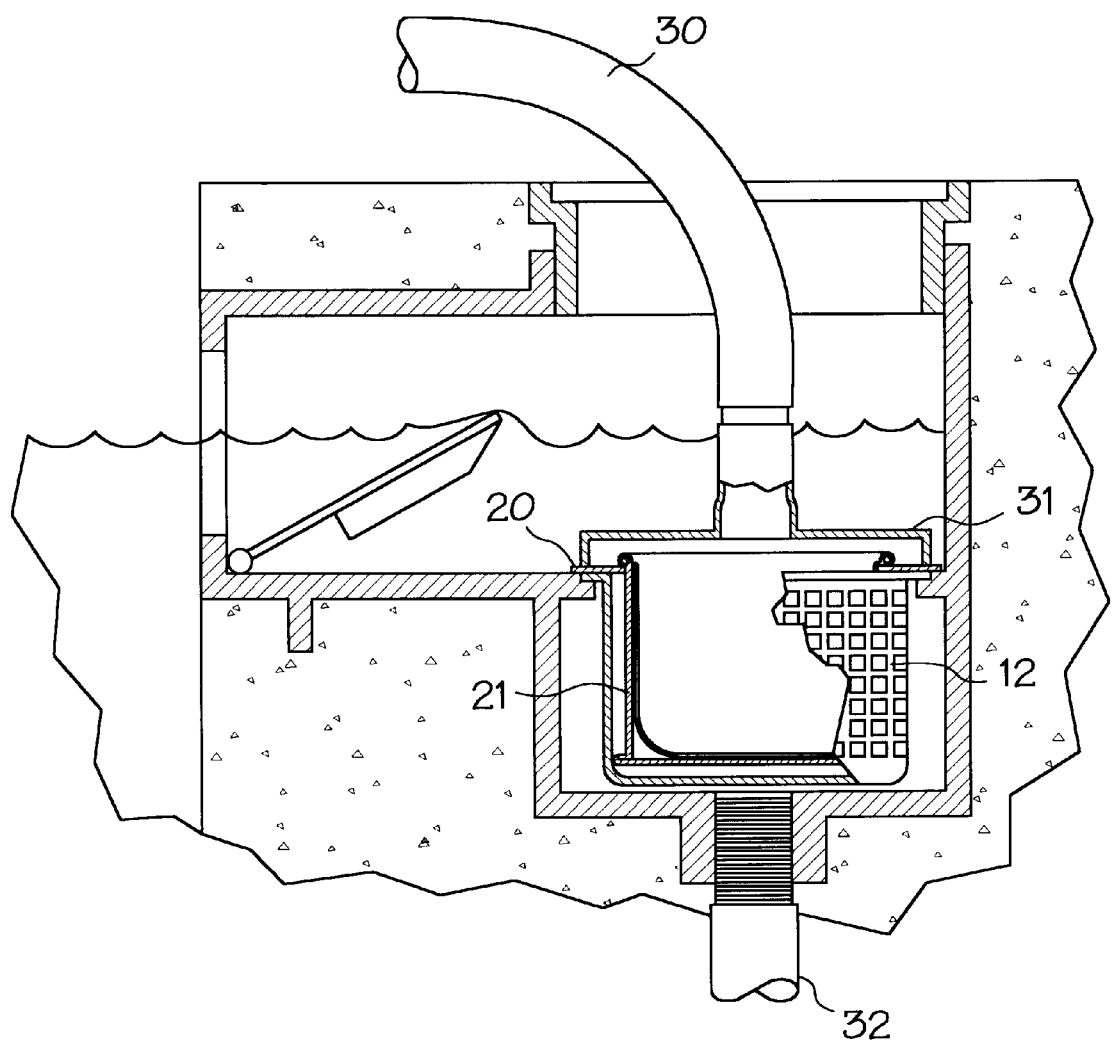
FIG. 5 is a side view partially in section showing operation of the auxiliary filter assembly of FIG. 1 in the process of removing debris from the swimming pool during a pool vacuuming operation.

As shown in FIG. 5, the auxiliary filter assembly can also be used to filter debris over several minutes such as when a pool vacuum line 30 is used to periodically draw water and debris from the bottom of the pool and direct it through the filter basket 21 for a one-time cleaning effort. A vacuum line cap 31 at a terminus of the vacuum line 30 is initially positioned on top of the adaptor collar 20 of the auxiliary filter assembly. Pool water is now pulled from the bottom of the pool, through the vacuum line, through the filter basket, through the skimmer basket and into a pipeline 32 leading to the primary filter apparatus. In this use, normally a substantial amount of debris pulled along with the pool water is trapped in the filter basket. When the pool is cleaned, the vacuum line and its vacuum line cap is removed from the skimmer. The whole assembly or just the filter basket is now removed, cleaned and replaced. The debris which is normally pulled into the primary filter apparatus has been diverted and necessarily substantially prolongs the time when the primary filter apparatus must itself be cleaned for proper operation.

Having described the invention in its preferred embodiment, it should be clear that modifications can be made without departing from the spirit of the invention. It is not intended that the words used to describe the invention nor the drawings illustrating the same be limiting on the invention. It is intended that the invention only be limited by the scope of the appended claims.

We claim:

1. An auxiliary filter assembly for a swimming pool skimmer to remove debris from swimming pool water for easy disposal, said assembly comprising:

(a) an adaptor collar for temporary placement within the skimmer to rest on a rim of an opening therewithin to provide a substantially rigid support; and (b) a cleanable filter basket of a water porous synthetic fabric material operably associated with the adaptor collar and removable therefrom for periodic cleaning purposes, said cleanable filter basket configured to fit within the skimmer to filter debris from swimming pool water as the pool water passes through the cleanable filter basket, said cleanable filter basket having an open top and further having a substantially rigid stabilizing ring permanently positioned in an edge defining the open top to rest on the adaptor ring, whereby the debris is filtered from the swimming pool water prior to reaching a primary filter apparatus.

2. The auxiliary filter assembly of claim 1 wherein the cleanable filter basket further has a handle attached thereto for grasping and separating the cleanable filter basket from the adaptor collar.

3. The auxiliary filter assembly of claim 1 wherein the cleanable filter basket is made from a non-woven synthetic fabric material.

4. The auxiliary filter assembly of claim 3 wherein the cleanable filter basket is made from polyester fabric.

5. The auxiliary filter assembly of claim 4 wherein the cleanable filter basket has a diameter of from about four inches to about ten inches and a height of from about three inches to about five inches.

6. The auxiliary filter assembly of claim 3 wherein the adaptor collar has an outside diameter of from about five inches to about ten inches and an inside diameter of from about three and one-half inches to about eight and one-half inches.

7. The auxiliary filter assembly of claim 6 wherein the adaptor collar is substantially flat.

8. The auxiliary filter assembly of claim 7 further wherein the adaptor collar has a thickness of from about 100 mils to about 400 mils.

9. The auxiliary filter assembly of claim 1 wherein the cleanable filter basket is made from a woven synthetic fabric material.

10. The auxiliary filter assembly of claim 1 wherein the water porous synthetic fabric material of the cleanable filter basket retains debris as small as 100 microns.

11. An auxiliary filter assembly for a swimming pool skimmer to remove debris from swimming pool water for easy disposal, said assembly comprising:

(a) an adaptor collar for placement within the skimmer to provide a substantially rigid support, said adaptor collar being substantially flat and having an outside diameter of from about five inches to about ten inches and an inside diameter of from about three and one-half inches to about eight and one-half inches; and (b) a cleanable filter basket of a water porous non-woven synthetic fabric material removably positioned on the adaptor collar to filter debris as small as 100 microns from swimming pool water as the pool water passes through the cleanable filter basket, said cleanable filter basket having an open top and further having (i) a substantially rigid stabilizing ring permanently positioned in an edge defining the open top to rest on the adaptor collar and (ii) a flexible handle attached to an inside surface of the cleanable filter basket for separating said cleanable filter basket from the adaptor collar during a cleaning operation, whereby the debris is filtered from the swimming pool water by the cleanable filter basket prior to reaching a main filter apparatus.

12. The auxiliary filter assembly of claim 11 wherein the cleanable filter basket is made from polyester fabric.

13. The auxiliary filter assembly of claim 12 wherein the cleanable filter basket has a diameter of from about four inches to about ten inches and a height of from about three inches to about five inches.

14. The auxiliary filter assembly of claim 13 further wherein the adaptor collar has a thickness of from about 100 mils to about 400 mils.

15. The auxiliary filter assembly of claim 11 wherein the cleanable filter basket is made from a woven synthetic fabric material.

16. An auxiliary filter assembly for use in a swimming pool skimmer to remove debris from swimming pool water for easy disposal, said assembly comprising:

(a) an adaptor collar for placement within the skimmer and to rest on a rim of an opening within the skimmer to provide a substantially rigid support, said adaptor collar being substantially flat with a thickness of from about 100 mils to about 400 mils and having an outside diameter of from about five inches to about ten inches and an inside diameter of from about three and one-half inches to about eight and one-half inches; and (b) a cleanable filter basket of a water porous fabric material to filter debris as small as 100 microns from swimming pool water as the pool water passes through the cleanable filter basket, said cleanable filter basket having an open top and further having a substantially rigid stabilizing ring permanently positioned in an edge defining the open top, said cleanable filter basket operably associated with the adaptor collar in a manner whereby the substantially rigid stabilizing ring of the cleanable filter basket rests on the adaptor collar, whereby the debris is filtered from the swimming pool water by the cleanable filter basket prior to reaching a main filter apparatus.

17. The auxiliary filter assembly of claim 16 wherein the water porous fabric material of the cleanable filter basket is a woven synthetic fabric.

18. The auxiliary filter assembly of claim 16 wherein the water porous fabric material of the cleanable filter basket is a non-woven synthetic fabric.

19. The auxiliary filter assembly of claim 18 wherein the cleanable filter basket is made from a polyester fabric.

* * * * *